(12) United States Patent
Li et al.

(10) Patent No.: US 10,509,258 B2
(45) Date of Patent: Dec. 17, 2019

(54) MANUFACTURING METHOD OF DISPLAY PANEL AND WIRE-GRATING POLARIZER AND MANUFACTURING METHOD THEREOF

(71) Applicant: Shenzhen China Star Optoelectronics Technology Co., Ltd., Shenzhen, Guangdong (CN)

(72) Inventors: Minghui Li, Guangdong (CN); Hsiao Hsien Chen, Guangdong (CN); Lixuan Chen, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 108 days.

(21) Appl. No.: 15/541,334

(22) PCT Filed: May 12, 2017

(86) PCT No.: PCT/CN2017/084113
§ 371 (c)(1),
(2) Date: Jun. 30, 2017

(87) PCT Pub. No.: WO2018/161432
PCT Pub. Date: Sep. 13, 2018

(65) Prior Publication Data
US 2018/0267355 A1  Sep. 20, 2018

(30) Foreign Application Priority Data

Mar. 9, 2017 (CN) .......................... 201710138382.8

(51) Int. Cl.
*G02F 1/1335* (2006.01)

(52) U.S. Cl.
CPC .. *G02F 1/133528* (2013.01); *G02F 1/133512* (2013.01); *G02F 1/133516* (2013.01)

(58) Field of Classification Search
None
See application file for complete search history.

(56) References Cited

U.S. PATENT DOCUMENTS 9,076,697 B2 * 7/2015 Lee .................. G03F 7/031
2012/0105779 A1 * 5/2012 Kim .................. G02F 1/13363
349/106

(Continued)

FOREIGN PATENT DOCUMENTS

CN    205317974 U    6/2016
CN    105789118 A    7/2016

(Continued)

*Primary Examiner* — Ryan Crockett
(74) *Attorney, Agent, or Firm* — Andrew C. Cheng (57) ABSTRACT

A manufacturing method of a display panel includes: arranging a plurality of wire-grating structures at intervals on a first substrate, wherein a plurality of transparent zones of the first substrate are defined among the plurality of wire-grating structures; adopting the wire-grating structure as a mask plate to form a black matrix on the transparent zone; providing a second substrate and a liquid crystal layer; and arranging the first substrate, the second substrate, and the liquid crystal layer to form the display panel. The present disclosure can save cost and simplifies processes.

11 Claims, 6 Drawing Sheets

(56) References Cited

U.S. PATENT DOCUMENTS

2013/0128194 A1* 5/2013 Liao .................. G02F 1/13452
349/106
2017/0205551 A1* 7/2017 Li .................... B29D 11/00644
2017/0261806 A1* 9/2017 Niu ...................... G02B 5/3058

FOREIGN PATENT DOCUMENTS

CN 106094083 A 11/2016
CN 106125185 A 11/2016

* cited by examiner

A plurality of wire-grating structures are arranged at intervals on a first substrate, and a plurality of transparent zones of the first substrate are defined among the plurality of wire-grating structures.  — S21

The wire-grating structure is used as a mask plate to form a black matrix (BM) in the transparent zone.  — S22

MANUFACTURING METHOD OF DISPLAY PANEL AND WIRE-GRATING POLARIZER AND MANUFACTURING METHOD THEREOF

BACKGROUND

1. Field of the Disclosure

The present disclosure relates to the field of display technology, and more particularly, to a manufacturing method of a display panel, a wire-grating polarizer, and a manufacturing method of the wire-grating polarizer.

2. Description of the Related Art

Generally, a black matrix (BM) is arranged on the display panel to block light to enhance the contrast, to avoid the mixture of red (R), green (G), and blue (B), to reduce reflection of an external light, and to prevent the external light from illustrating amorphous silicon (a-Si) layer of thin film transistor (TFT) device to reduce the possibility of electricity leakage.

However, it is necessary to purchase or produce a mask plate before the BM is processed. It also needs an independent process to produce the BM. Because of these reasons, it is very complicated to produce the entire display panel. In this way, it is disadvantageous of reducing costs and simplifying processes. It is also hard to make the display panel thin and light because the BM solely occupies the thickness of the panel.

SUMMARY

An object of the present disclosure is to propose a manufacturing method of a display panel, a wire-grating polarizer, and a manufacturing method of the wire-grating polarizer to reduce costs, simplify processes, and to make the display panel thin and light.

According to one embodiment of the present disclosure, a manufacturing method of a display panel includes: arranging a plurality of wire-grating structures at intervals on a first substrate, wherein a plurality of transparent zones of the first substrate are defined among the plurality of wire-grating structures; adopting the wire-grating structure as a mask plate to form a black matrix on the transparent zone; providing a second substrate and a liquid crystal layer; arranging the first substrate, the second substrate, and the liquid crystal layer to form the display panel. A step of arranging the plurality of wire-grating structures at intervals on the first substrate includes: forming a wire-grating material layer on the first substrate; coating a photoresist material on the wire-grating material layer to form a photoresist layer; imprinting the photoresist layer to expose a portion of the wire-grating material layer; etching the exposed portion of the wire-grating material layer; and removing the photoresist layer. The wire-grating structure comprises a plurality of wire gratings; the plurality of wire gratings are arranged at intervals. An interval of between the wire-grating structures ranges from 50 micrometers ($\mu m$) to 1000 $\mu m$. An interval between two wire gratings ranges from 50 nanometers (nm) to 1000 nm.

According to another embodiment of the present disclosure, a manufacturing method of a display panel includes: arranging a plurality of wire-grating structures at intervals on a first substrate, wherein a plurality of transparent zones of the first substrate are defined among the plurality of wire-grating structures; adopting the wire-grating structure as a mask plate to form a black matrix on the transparent zone; providing a second substrate and a liquid crystal layer; and arranging the first substrate, the second substrate, and the liquid crystal layer to form the display panel.

According to still another embodiment of the present disclosure, a wire-grating polarizer includes a plurality of wire-grating structures and a plurality of black matrices. The plurality of wire-grating structures are arranged at intervals, and the plurality of black matrices are arranged among the plurality of wire-grating structures.

Compared with the related art, the present disclosure provides the following benefits. A plurality of wire-grating structures are arranged on a first substrate. The plurality of wire-grating structures are arranged at intervals. A plurality of transparent zones of the first substrate are defined among the plurality of wire-grating structures. The wire-grating structure is used as a mask plate to form a BM in a transparent zone. A second substrate and a liquid crystal layer are provided. The first substrate, the second substrate, and the liquid crystal layer form a display panel. Because the wire-grating structure is used as the mask plate to form the BM on the first substrate, it is not necessary to produce or purchase a mask plate to produce the BM. So the costs reduce obviously. It is not necessary to use an independent process to produce the BM so the process of producing the display panel is simplified. Besides, the BM shares the thickness of a part of the display panel with the wire-grating structure of a wire-grating polarizer so the display panel is thin and light.

DETAILED DESCRIPTION OF THE EMBODIMENTS

The drawings illustrate embodiments of the invention and, together with the description, serve to explain the principles of the invention.

Figure 1:
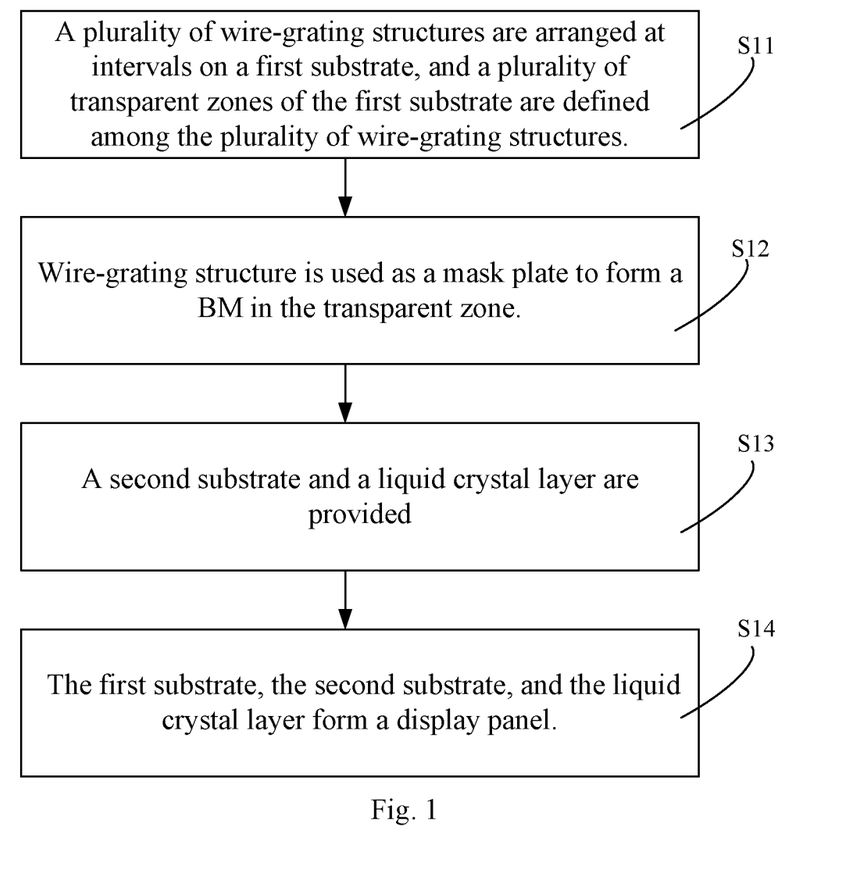
FIG. 1 illustrates a flow diagram of a manufacturing method of a display panel according to an embodiment of the present disclosure.

Please refer to FIG. 1 illustrating a flow diagram of a manufacturing method of a display panel according to an embodiment of the present disclosure.

The manufacturing method of the display panel includes block S11, block S12, block S13, and block S14.

At block S11, a plurality of wire-grating structures are arranged at intervals on a first substrate, and a plurality of transparent zones of the first substrate are defined among the plurality of wire-grating structures.

In block S11, a plurality of wire-grating structures are arranged at intervals on a first substrate. The wire-grating structure may include a plurality of wire gratings arranged at intervals. Block S11 is detailed as follows. The wire-grating structure is a wire-grating polarizer formed on the first substrate. The wire-grating structure has a function of polarization. The wire-grating structure accompanied by a liquid crystal layer realizes diverse display effects of the display panel. The first substrate may be a color filter substrate or a thin film transistor (TFT) array substrate.

Figure 2:
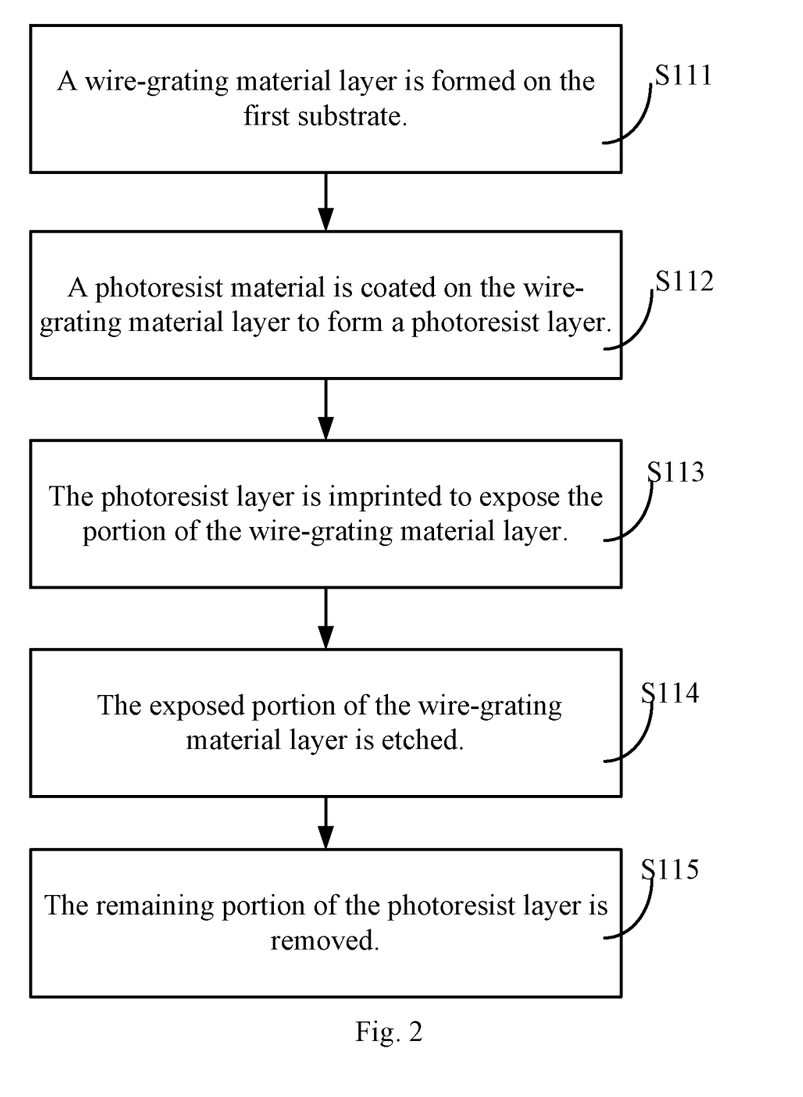
FIG. 2 is a flow diagram of block S11 illustrated in FIG. 1.
Figure 3:
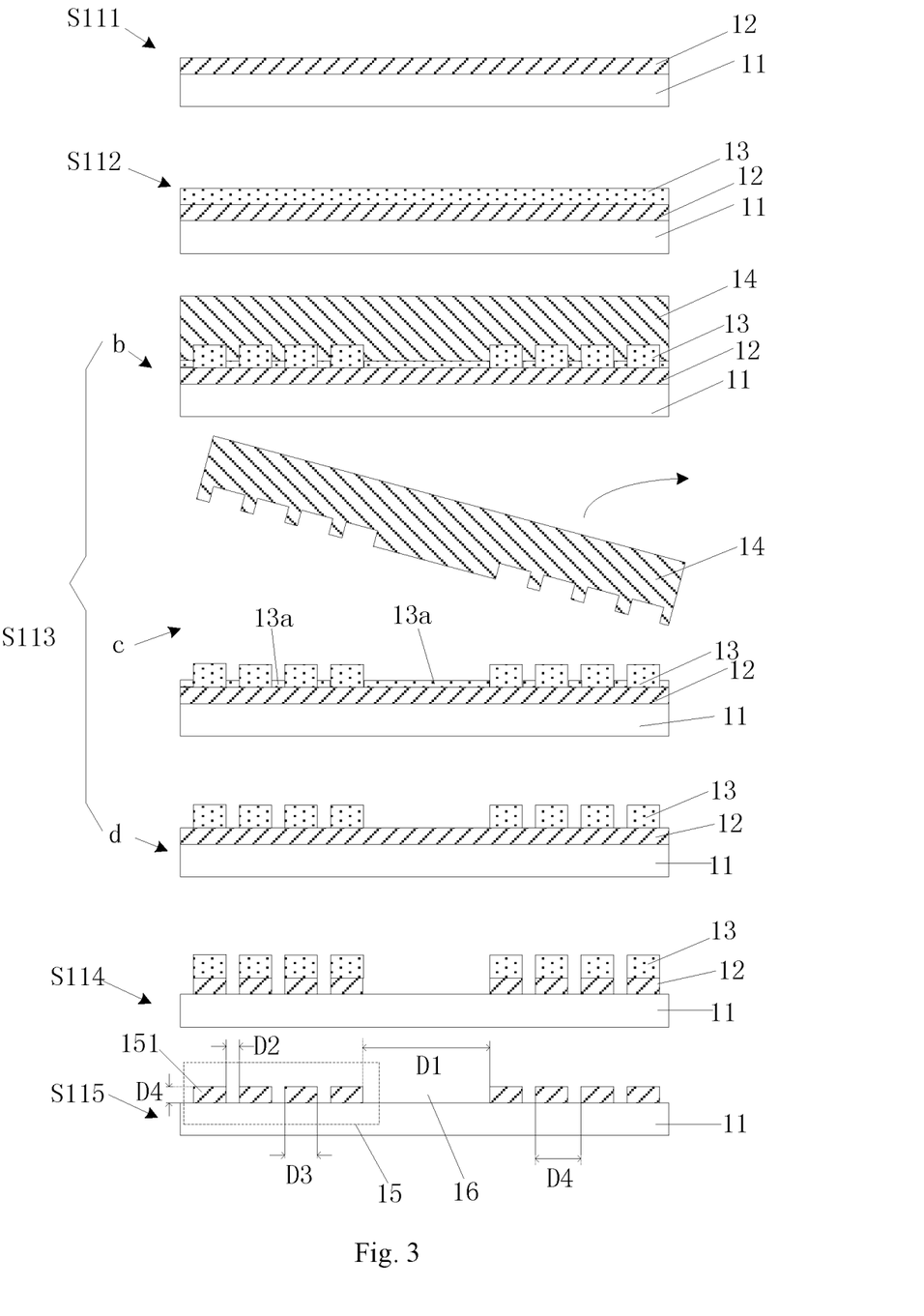
FIG. 3 is a schematic diagram of processes corresponding to process illustrated in FIG. 2.

Please refer to FIG. 2 and FIG. 3. FIG. 2 is a flow diagram of block S11 illustrated in FIG. 1. FIG. 3 is a schematic diagram of processes corresponding to process illustrated in FIG. 2. The manufacturing method of the plurality of wire-grating structures arranged at intervals on the first substrate includes block S111, block S112, block S113, block S114, and block S115.

At block S111, a wire-grating material layer is formed on the first substrate.

In block S111, for example, a wire-grating material layer 12 is formed on the first substrate 11. Material for the wire-grating material layer 12 may be metals. Specifically, material for the wire-grating material layer 12 may be metals such as aluminum (Al), chromium (Cr), gold (Au), silver (Ag), and nickel (Ni).

At block S112, a photoresist material is coated on the wire-grating material layer to form a photoresist layer.

In block S112, for example, a photoresist material is coated on the wire-grating material layer 12 to form a photoresist layer 13.

At block S113, the photoresist layer is imprinted to expose the portion of the wire-grating material layer.

Block S113 of imprinting the photoresist layer 13 to expose the wire-grating material layer 12 partially is to imprint the photoresist layer 13 by applying nano-imprint lithography (NIL) specifically. Block S113 of imprinting the photoresist layer 13 by applying nano-imprint lithography includes a, b, c, and d blocks as follows. At block a, the photoresist layer 13 is heated. At block b, the photoresist layer 13 is imprinted with a nano-imprint mold. At block c, the nano-imprint mold 14 is removed from the photoresist layer 13. At block d, the photoresist material on the recess 13a of the imprinted photoresist layer 13 is etched and removed to expose the wire-grating material layer 12 partially. Before the nano-imprint mold 14 is removed from the photoresist layer 13, the photoresist layer 13 and the nano-imprint mold 14 are cooled down. Reactive-ion etching (RIE) can be applied at block d.

At block S114, the exposed portion of the wire-grating material layer is etched.

In block S114, the exposed portion of the wire-grating material layer 12 is etched.

At block S115, the photoresist layer is removed.

In block S115, the remaining portion of the photoresist layer is removed to obtain a plurality of plurality of wire-grating structures 15. A plurality of transparent zones 16 of the first substrate are defined among the plurality of wire-grating structures 15. Only two of the plurality of adjacent wire-grating structures 15 and one of the plurality of transparent zones 16 between the two adjacent wire-grating structures 15 are illustrated in the figure. Those skilled in the art should understand the plurality of wire-grating structures 15 and the transparent zone 16 between the two adjacent wire-grating structures 15.

The wire-grating structure 15 may include a plurality of wire gratings 151 arranged at intervals. The interval d1 between the wire-grating structures 15 ranges from 50 micrometers (μm) to 1000 μm. So the width of the transparent zone 16 may range from 50 μm to 1000 μm. The interval d2 between the wire gratings 151 may range from 50 nanometers (nm) to 1000 nm.

The width d3 of the wire grating 151 may range from 50 nm to 200 nm. The height d4 of the wire grating 151 may range from 50 nm to 500 nm. The cycle d5 of the wire grating 151 may range from 100 nm to 300 nm. The cycle d5 of the wire grating 151 indicates the staggery distance d5 of the adjacent two wire gratings 151 in the same wire-grating structure 15, that is, the interval d5 between the adjacent two wire gratings 151 arranged at the same lateral side such as the interval d5 between a left lateral side and a left lateral side of the adjacent two wire gratings 151 or the interval d5 between a right lateral side and a right lateral side of the adjacent two wire gratings 151.

The cycle of the wire-grating structure is produced by applying nano-imprint lithography (NIL) to form periodically arranged wire gratings. The wire gratings in the wire-grating structure applying nano-imprint lithography can reach the nano magnitude. The cycle of the wire grating is less than the wavelength of an incident light. As a result, the polarization effect of the sub-wavelength wire grating is generated so that transmittance of a pixel aperture area of the wire-grating structure is high.

At block S12, the wire-grating structure is used as a mask plate to form a BM in the transparent zone.

Figure 4:
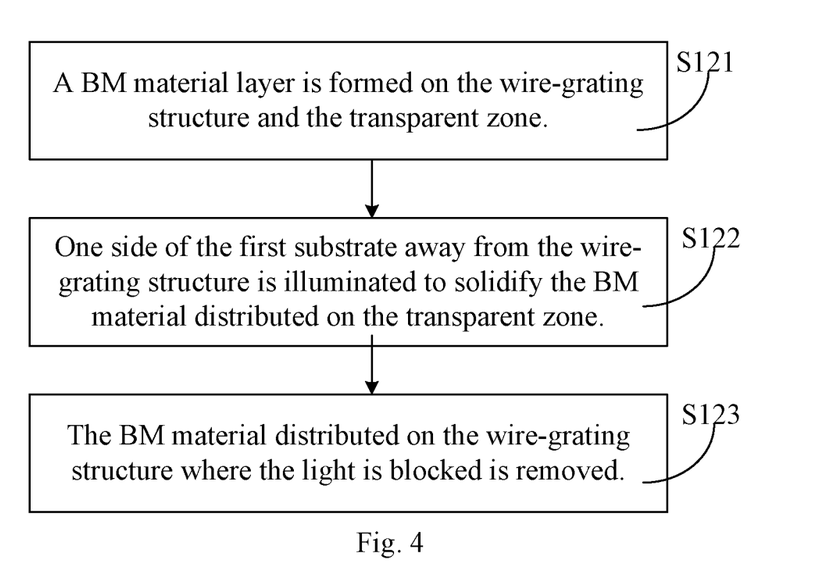
FIG. 4 is a flow diagram of block S12 illustrated in FIG. 1.
Figure 5:
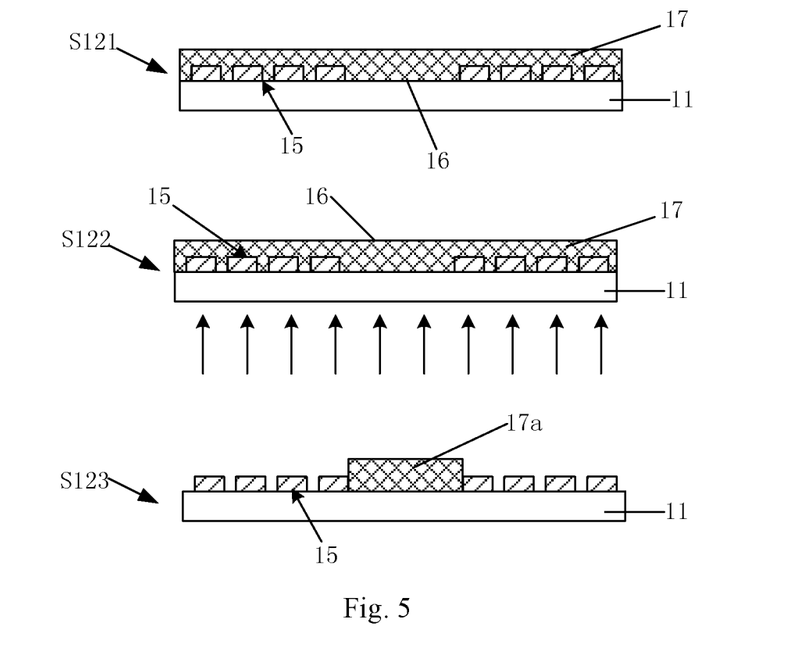
FIG. 5 is a schematic diagram of processes corresponding to process illustrated in FIG. 4.

Please refer to FIG. 4 and FIG. 5. FIG. 4 is a flow diagram of block S12 illustrated in FIG. 1. FIG. 5 is a schematic diagram of processes corresponding to process illustrated in FIG. 4. The manufacturing method of using the wire-grating structure as the mask plate to form the BM in the transparent zone includes block S121, block S122, block S123, block S13, and block S14.

At block S121, a BM material layer is formed on the wire-grating structure and the transparent zone.

In block S121, for example, a BM material layer 17 is formed on the wire-grating structure 15 and the transparent zone 16.

At block S122, one side of the first substrate away from the wire-grating structure is illuminated to solidify the BM material distributed on the transparent zone.

In block S122, for example, one side of the first substrate 11 away from the wire-grating structure 15 is illuminated to solidify the BM material distributed on the transparent zone 16. For example, the side of the first substrate 11 is exposed backward from bottom to top with ultraviolet radiation. The ultraviolet radiation is linear polarized light. The polarizing direction of the ultraviolet radiation is vertical to the polarizing direction of the wire grating formed by the first substrate. Accordingly, the area where the wire-grating structure 15 is arranged is not illuminated with the ultraviolet radiation when the side of the first substrate 11 is exposed; the BM material on the corresponding zone is not solidified; the BM 17a on the transparent zone 16 is solidified with the ultraviolet radiation.

At block S123, the BM material distributed on the wire-grating structure where the light is blocked is removed.

In block S123, for example, the BM material distributed on the wire-grating structure 15 where the light is blocked is removed.

At block S13, a second substrate and a liquid crystal layer are provided.

Figure 6:
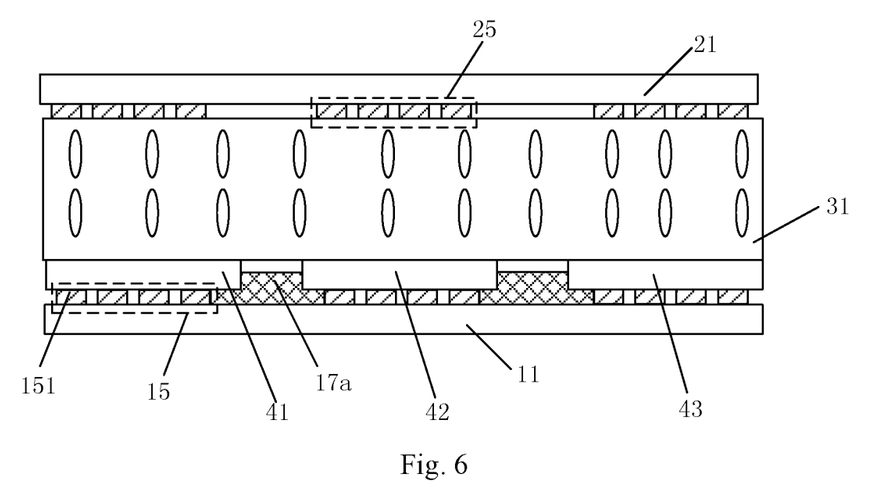
FIG. 6 illustrates a schematic diagram of block S13 and block S14.

Please refer to FIG. 6 illustrating a schematic diagram of block S13 and block S14. The second substrate 21 may be a color filter substrate or a TFT array substrate. After block S123, a resistor layer is formed on the wire-grating structure 15 and the BM 17a. The resistor layer includes a red (R) resistor, a green (G) resistor, and a blue (B) resistor. For example, each of the RGB resistors is a first resistor 41, a second resistor 42, and a third resistor 43 correspondingly. The BM 17a may be arranged in a gap between any adjacent resistors on the first substrate 11.

At block S14, the first substrate, the second substrate, and the liquid crystal layer form a display panel.

In block S14, the liquid crystal layer 13 is sandwiched between the first substrate 11 and the second substrate 21.

A wire-grating structure 25 may be formed on the second substrate 21 as well. The wire-grating structure 25 is similar to the wire-grating structure 15 on the first substrate 11 so the wire-grating structure 25 is not going to be detailed. The details related to the wire-grating structure 25 can refer to the descriptions above.

The BM may be formed on the color filter substrate or the TFT array substrate. In the figures, the BM is formed on a flat display panel. The present disclosure may be applied to a recessed display panel as well. After the recessed display panel is applied, the BM can be formed on the TFT array substrate. Accordingly, the TFT array substrate and the color filter substrate will not shift on the condition of occurrence. The light leakage is prevented as well.

The arrangement of the BM may enhance the contrast of the display panel, avoid the mixture of resistors such as adjacent red (R), green (G), and blue (B), and reduce reflection of external light, prevent external light from illuminating a polysilicon layer of the TFT array layer on the TFT array substrate to reduce the possibility of leakage of electricity and light. Generally, the BM is arranged on the display panel to block light.

Figure 7:
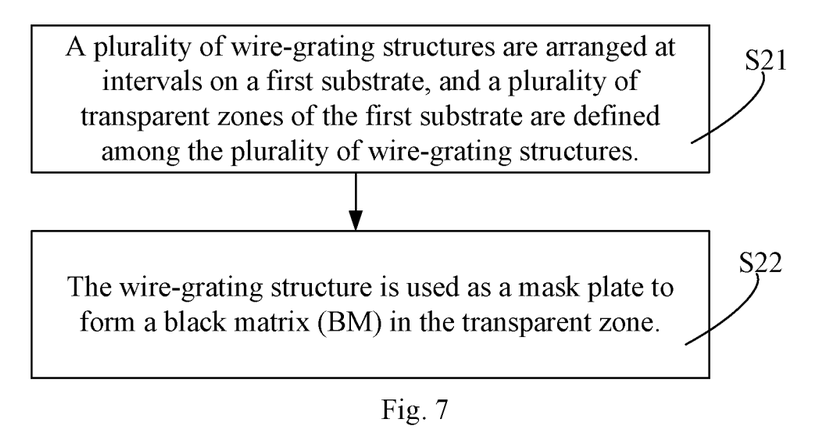
FIG. 7 illustrates a flow diagram of a wire-grating polarizer according to another embodiment of the present disclosure.

Please refer to FIG. 7 illustrating a flow diagram of a wire-grating polarizer according to another embodiment of the present disclosure. The manufacturing method includes block S21 and block S22.

At block S21, a plurality of wire-grating structures are arranged at intervals on a first substrate, and a plurality of transparent zones of the first substrate are defined among the plurality of wire-grating structures.

At block S22, the wire-grating structure is used as a mask plate to form a black matrix (BM) 17a in the transparent zone.

Block S21 is similar to block S11 so block S21 is not going to be detailed. Block S22 is similar to block S12 so block S22 is not going to be detailed. The details related to block S21 and block S22 can refer to the descriptions above.

Figure 8:
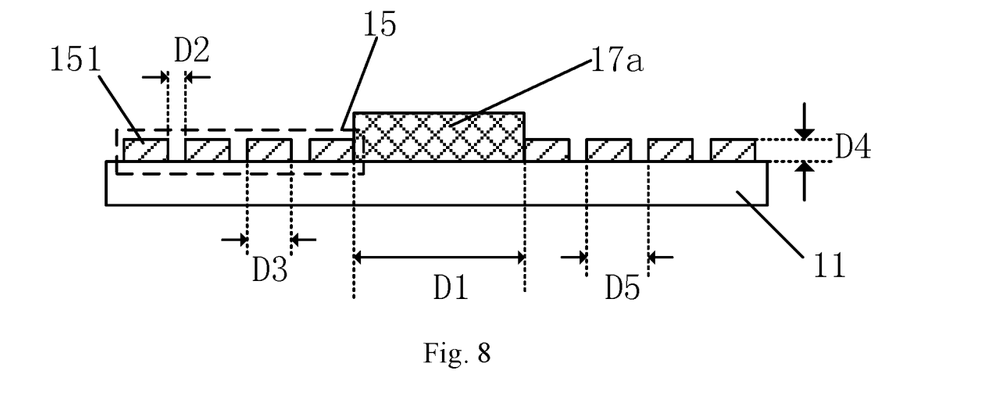
FIG. 8 illustrates a schematic diagram of the structure of the wire-grating polarizer according to the embodiment of the present disclosure.

Please refer to FIG. 8 illustrating a schematic diagram of the structure of the wire-grating polarizer according to the embodiment of the present disclosure. The wire-grating polarizer includes the plurality of wire-grating structures 15 and the plurality of BMs 17a. The plurality of wire-grating structures 15 are arranged at intervals. The plurality of BMs 17a are arranged between the plurality of wire-grating structures 15.

Each of the wire-grating structures 15 includes a plurality of wire gratings 151 arranged at intervals. The interval $d1$ between the wire-grating structures 15 ranges from 50 μm to 1000 μm. So the width of the black matrices 17a may range from 50 μm to 1000 μm. The interval $d2$ between the wire gratings 151 may range from 50 nm to 1000 nm.

The width $d3$ of the wire grating 151 may range from 50 nm to 200 nm. The height $d4$ of the wire grating 151 may range from 50 nm to 500 nm. The cycle $d5$ of the wire grating 151 may range from 100 nm to 300 nm. The cycle $d5$ of the wire grating 151 indicates the staggery distance $d5$ of the adjacent two wire gratings 151 in the same wire-grating structure 15, that is, the interval $d5$ between the adjacent two wire gratings 151 arranged at the same lateral side such as the interval $d5$ between a left lateral side and a left lateral side of the adjacent two wire gratings 151 or the interval $d5$ between a right lateral side and a right lateral side of the adjacent two wire gratings 151.

The wire-grating structure and the BM has been introduced above so the specifications will not describe again.

The present disclosure provides a plurality of wire-grating structures arranged on a first substrate. The plurality of wire-grating structures are arranged at intervals. A plurality of transparent zones of the first substrate are defined among the plurality of wire-grating structures. The wire-grating structure is used as a mask plate to form a BM in a transparent zone. A second substrate and a liquid crystal layer are provided. The first substrate, the second substrate, and the liquid crystal layer form a display panel. Because the wire-grating structure is used as the mask plate to form the BM on the first substrate, it is not necessary to produce or purchase a mask plate to produce the BM. So the costs reduce obviously. It is not necessary to use an independent process to produce the BM so the process of producing the display panel is simplified. Besides, the BM shares the thickness of a part of the display panel with the wire-grating structure of a wire-grating polarizer so the display panel is thin and light.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A manufacturing method of a display panel, comprising:
    arranging a plurality of wire-grating structures at intervals on a first substrate, wherein a plurality of transparent zones of the first substrate are defined among the plurality of wire-grating structures;
    adopting the wire-grating structure as a mask plate to form a black matrix on the transparent zone;
    providing a second substrate and a liquid crystal layer;
    arranging the first substrate, the second substrate, and the liquid crystal layer to form the display panel,
    wherein a step of arranging the plurality of wire-grating structures at intervals on the first substrate comprises:
    forming a wire-grating material layer on the first substrate;
    coating a photoresist material on the wire-grating material layer to form a photoresist layer;
    imprinting the photoresist layer to expose a portion of the wire-grating material layer;
    etching the exposed portion of the wire-grating material layer; and
    removing the photoresist layer,
    wherein the wire-grating structure comprises a plurality of wire gratings; the plurality of wire gratings are arranged at intervals; an interval of between the wire-grating structures ranges from 50 micrometers (μm) to 1000 µm; an interval between two wire gratings ranges from 50 nanometers (nm) to 1000 nm.

2. The manufacturing method of claim 1, wherein a step of imprinting the photoresist layer to expose a portion of the wire-grating material layer comprises:
   imprinting the photoresist layer by applying nano-imprint lithography.

3. The manufacturing method of claim 2, wherein a step of imprinting the photoresist layer by applying the nano-imprint lithography comprises:
   heating the photoresist layer;
   imprinting the photoresist layer with a nano-imprint mold;
   removing the nano-imprint mold from the photoresist layer;
   etching and removing the photoresist material on a recess of the imprinted photoresist layer to expose the portion of the wire-grating material layer.

4. The manufacturing method of claim 1, wherein a width of the wire grating ranges from 50 nm to 200 nm; a height of the wire grating ranges from 50 nm to 500 nm; a cycle of the wire grating ranges from 100 nm to 300 nm.

5. The manufacturing method of claim 1, wherein a step of adopting the wire-grating structure as the mask plate to form the black matrix on the transparent zone comprises:
   forming a black matrix material layer on the wire-grating structure and the transparent zone;
   illuminating one side of the first substrate away from the wire-grating structure to solidify the black matrix material distributed on the transparent zone;
   removing the black matrix material distributed on the wire-grating structure where light is blocked.

6. A manufacturing method of a display panel, comprising:
   arranging a plurality of wire-grating structures at intervals on a first substrate, wherein a plurality of transparent zones of the first substrate are defined among the plurality of wire-grating structures;
   adopting the wire-grating structure as a mask plate to form a black matrix on the transparent zone;
   providing a second substrate and a liquid crystal layer;
   arranging the first substrate, the second substrate, and the liquid crystal layer to form the display panel;
   wherein the wire-grating structure comprises a plurality of wire gratings; the plurality of wire gratings are arranged at intervals; an interval of between the wire-grating structures ranges from 50 micrometers (µm) to 1000 µm; an interval between two wire gratings ranges from 50 nanometers (nm) to 1000 nm.

7. The manufacturing method of claim 6, wherein a step of arranging the plurality of wire-grating structures at intervals on the first substrate comprises:
   forming a wire-grating material layer on the first substrate;
   coating a photoresist material on the wire-grating material layer to form a photoresist layer;
   imprinting the photoresist layer to expose a portion of the wire-grating material layer;
   etching the exposed portion of the wire-grating material layer; and
   removing the photoresist layer.

8. The manufacturing method of claim 7, wherein a step of imprinting the photoresist layer to expose a portion of the wire-grating material layer comprises:
   imprinting the photoresist layer by applying nano-imprint lithography.

9. The manufacturing method of claim 8, wherein a step of imprinting the photoresist layer by applying the nano-imprint lithography comprises:
   heating the photoresist layer;
   imprinting the photoresist layer with a nano-imprint mold;
   removing the nano-imprint mold from the photoresist layer;
   etching and removing the photoresist material on a recess of the imprinted photoresist layer to expose the portion of the wire-grating material layer.

10. The manufacturing method of claim 6, wherein a width of the wire grating ranges from 50 nm to 200 nm; a height of the wire grating ranges from 50 nm to 500 nm; a cycle of the wire grating ranges from 100 nm to 300 nm.

11. The manufacturing method of claim 6, wherein a step of adopting the wire-grating structure as the mask plate to form the black matrix on the transparent zone comprises:
   forming a black matrix material layer on the wire-grating structure and the transparent zone;
   illuminating one side of the first substrate away from the wire-grating structure to solidify the black matrix material distributed on the transparent zone;
   removing the black matrix material distributed on the wire-grating structure where light is blocked.

* * * * *